Figure 1:
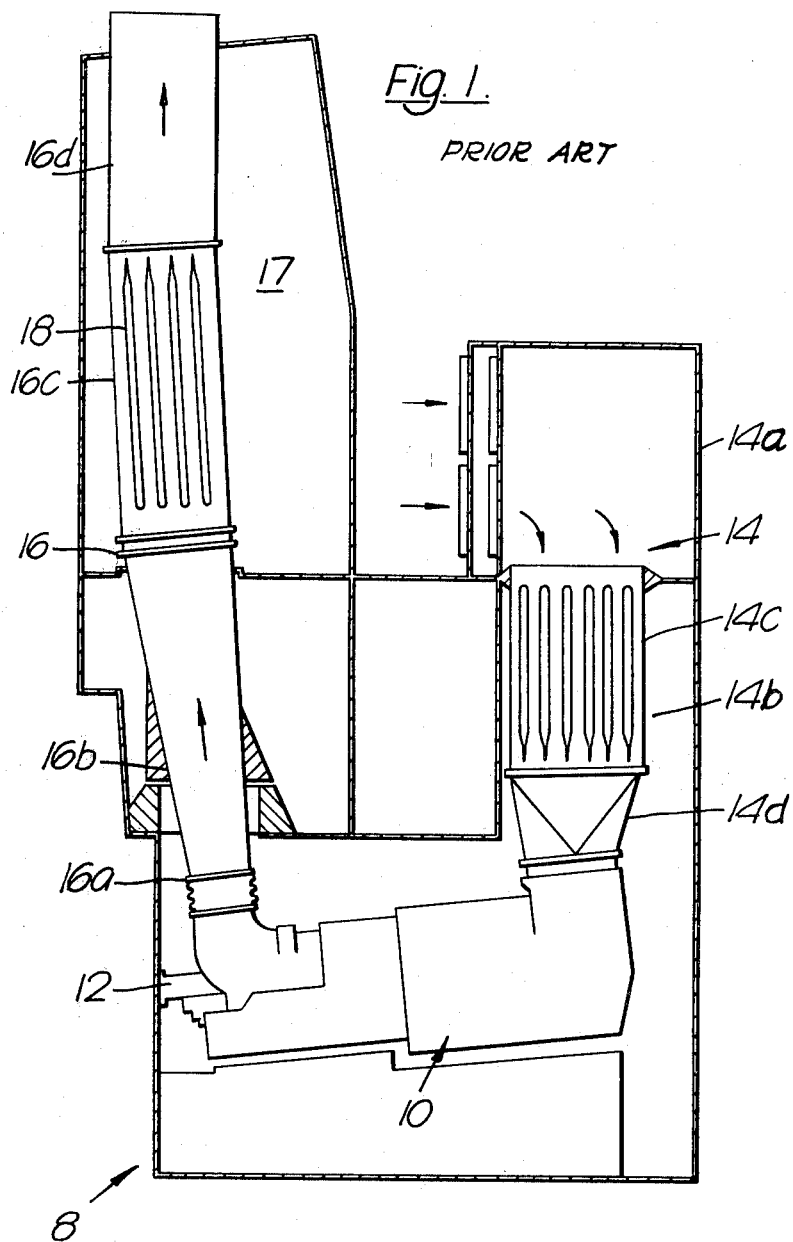

United States Patent [19]

Webb et al.

[11] 4,212,259
[45] Jul. 15, 1980

[54] MARINE VESSEL NOISE ATTENUATING STRUCTURE

[75] Inventors: Victor A. Webb; Arthur D. Wells, both of Coventry; Geoffrey C. Clarke, Rugby; Charles P. R. Peecock, Harrow, all of England

[73] Assignee: Rolls-Royce Limited, London, England

[21] Appl. No.: 969,978

[22] Filed: Dec. 15, 1978

[30] Foreign Application Priority Data

Dec. 22, 1977 [GB] United Kingdom ............... 53882/77

[51] Int. Cl.² ............................................ E04F 17/04
[52] U.S. Cl. ..................................... 115/73; 181/224; 181/212; 181/282
[58] Field of Search ............... 181/212, 214, 217, 218, 181/222, 224, 282, 292, 286, 235; 115/34 R, 73; 55/DIG. 30

[56] References Cited

U.S. PATENT DOCUMENTS

| 3,437,173 | 4/1969 | Ehrich | 181/213 |
| 3,819,009 | 6/1974 | Motsinger | 181/292 |
| 4,035,535 | 7/1977 | Taylor | 181/292 |
| 4,091,892 | 5/1978 | Hehmann et al. | 181/292 |
| 4,101,280 | 7/1978 | Frietzsche et al. | 55/DIG. 30 |
| 4,106,587 | 8/1978 | Nash et al. | 181/222 |

Primary Examiner—L. T. Hix
Assistant Examiner—Benjamin R. Fuller
Attorney, Agent, or Firm—Cushman, Darby & Cushman

[57] ABSTRACT

The exhaust or the inlet duct of a marine gas turbine engine power plant installation comprises a porous duct, a plurality of circumferentially arranged non-porous channel members attached to and axially spaced along the porous duct, the channel members and the porous duct together defining a plurality of annular noise attenuating cells, and at least one layer of heat insulating material surrounding the channel members, the insulating material being contained with a cover and attached to the porous duct.

10 Claims, 5 Drawing Figures

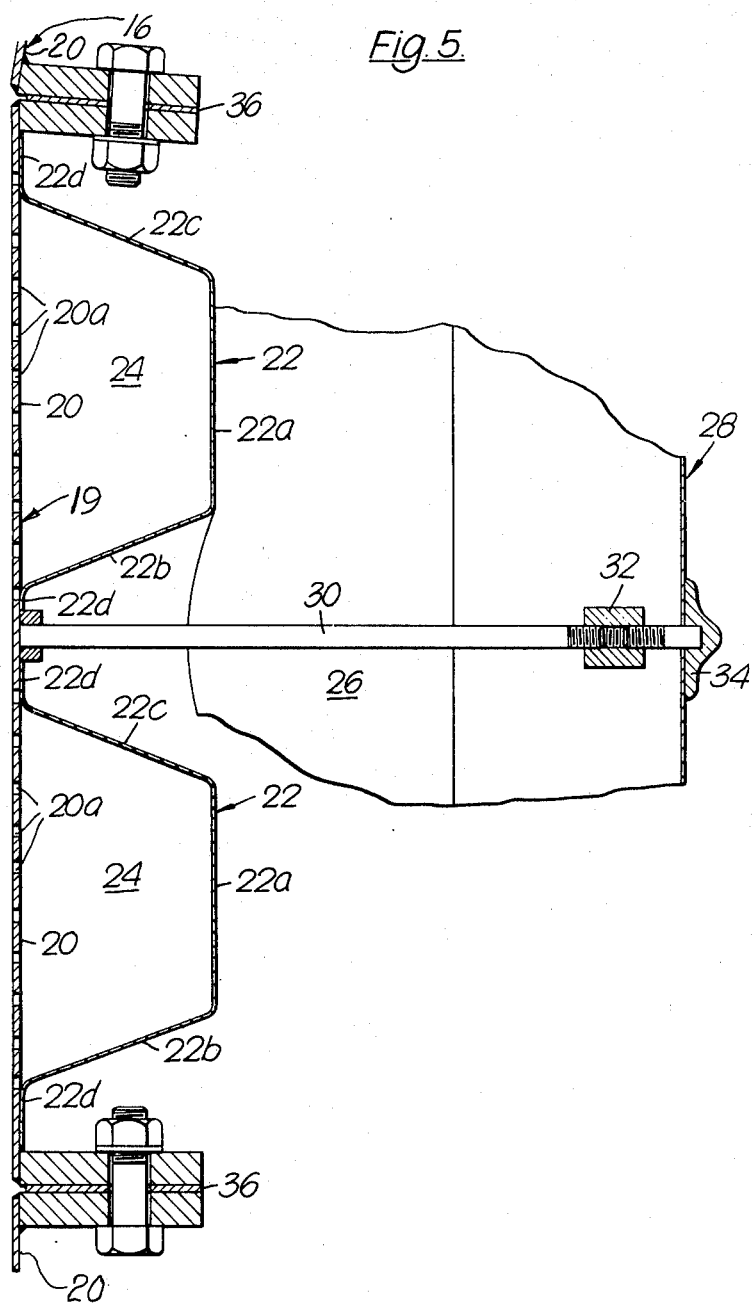

MARINE VESSEL NOISE ATTENUATING STRUCTURE

This invention relates to noise attenuating structures, marine vessels incorporating such structures and is particularly though not exclusively concerned with providing a noise attenuating duct for the hot gas exhaust of a marine gas turbine engine power plant.

The use of gas turbine engines as the main power plant for marine vessels dictates the provision of large inlet and exhaust ducts because of the large mass of air consumed by the engine. The exhaust from the engine consists of a hot, high speed and large mass flow of gas which would, if not attenuated, create a considerable amount of very undesirable noise. Such noise is commonly attenuated by the use of sound absorbing splitters in the exhaust duct and these splitters can be relatively heavy and can in certain vessels affect the stability and manoeuverability of such vessels.

The present invention seeks to provide a relatively lightweight sound attenuating duct for the exhaust or inlet of a marine gas turbine engine power plant and for other purposes.

The present invention provides a marine vessel having a gas turbine engine power plant, the gas turbine engine power plant having associated gas flow duct means supported by the structure of the vessel and located within a well in the vessel structure, the gas flow duct means comprising at least one gas flow duct having a porous inner member, a plurality of circumferentially arranged non-porous channel members attached to the porous inner member and axially spaced along the porous inner member, the channel member and the porous inner member together defining a plurality of annular noise attenuating cells and at least one layer of heat insulating material surrounding the non-porous channel members, the said insulating material being contained within covering means and secured to the gas flow duct means.

The present invention further provides a sound attenuating duct comprising a porous inner member, a plurality of circumferentially arranged non-porous channel members attached to the porous inner member, the channel members and the porous inner member between them defining a plurality of annular noise attenuating cells.

Figure 2:
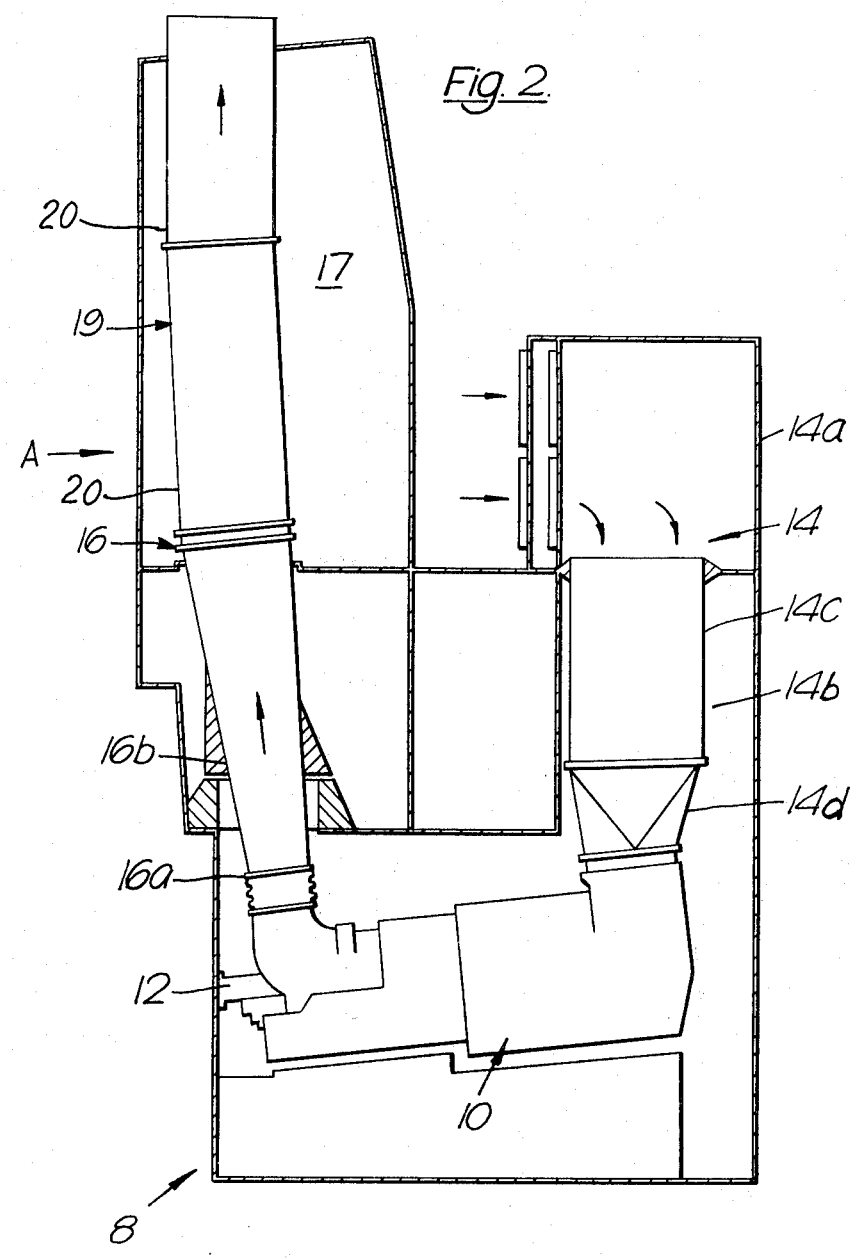
Figure 3:
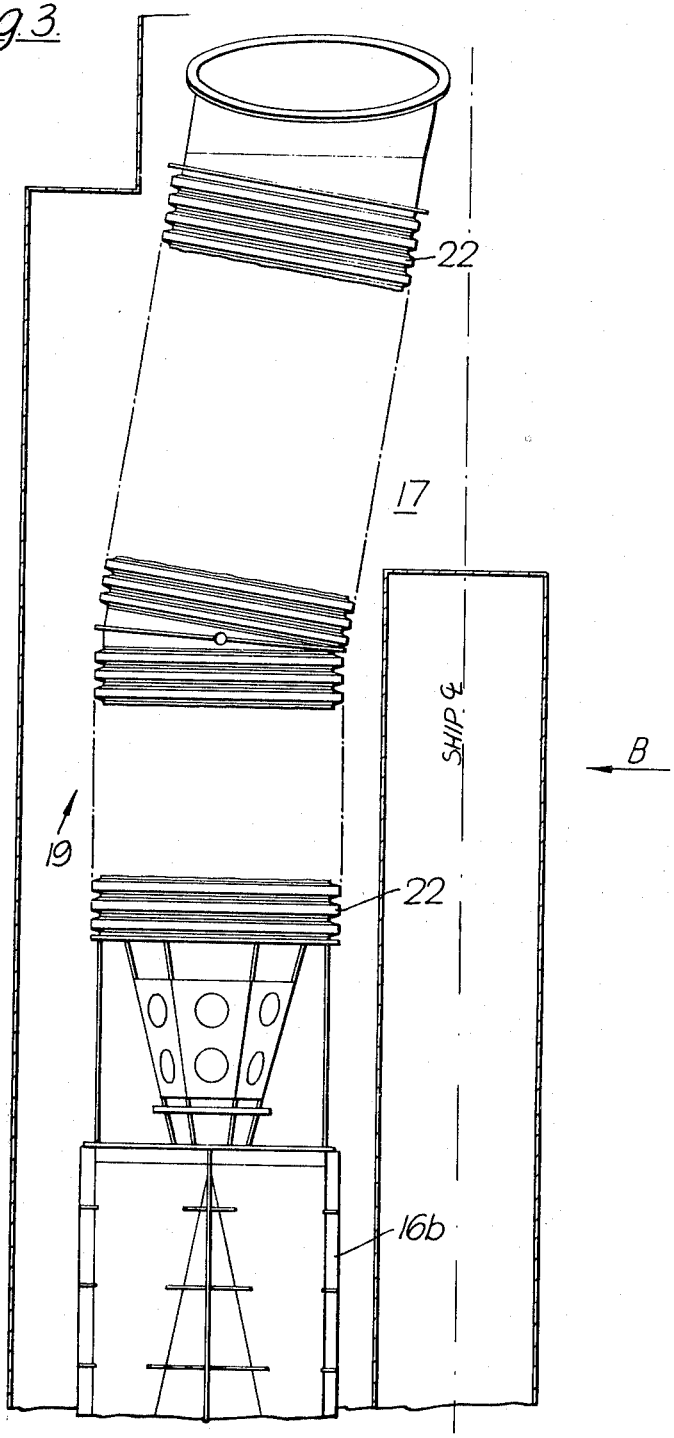
Figure 4:
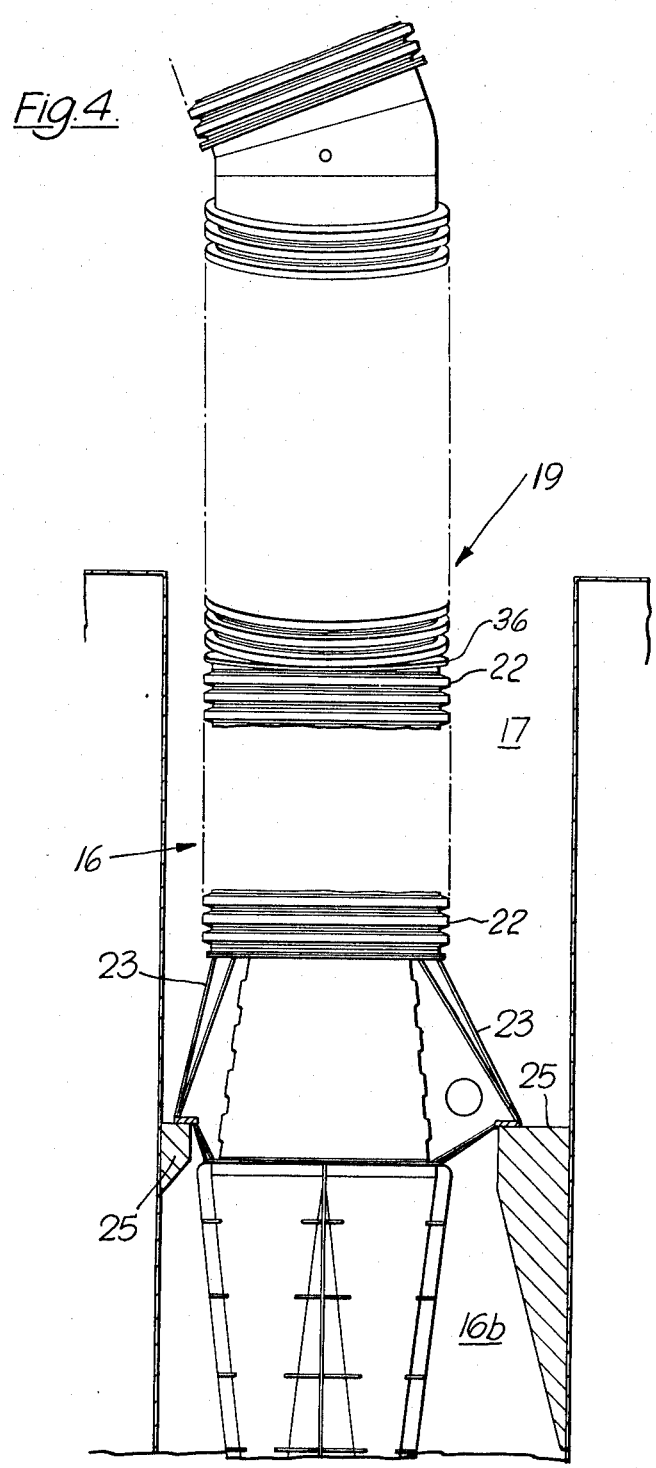

The present invention will now be more particularly described with reference to the accompanying drawings in which, FIG. 1 shows in diagrammatic form, a part of a marine vessel having a gas turbine power plant installation which incorporates a known form of noise attenuating duct, FIG. 2 shows in diagrammatic form, a part of a marine vessel having a gas turbine power plant incorporating one form of noise attenuating duct according to the present invention, FIG. 3 is a view on arrow A in FIG. 2 showing to a larger scale the sound attenuating duct of FIG. 2, FIG. 4 is a view on arrow B in FIG. 3 and, FIG. 5 is detailed view of part of the duct shown in FIGS. 2 to 4 inclusive, Referring to FIG. 1, a marine vessel 8, only a part of which is shown has a gas turbine engine power plant comprising a gas generator and power turbine 10 which drives a shaft 12, an ambient air inlet duct 14 and a hot gas exhaust duct 16 which is supported and located in a well 17 of the vessel 8. The ambient air inlet comprises water droplet separatory a 14a rectangular entry section 14d and a transition section 14b to connect with the circular entry to the gas generator. The hot gas exhaust duct 16 comprises a transition section 16a, a diffuser section 16b, a parallel walled section 16c in which sound absorbing splitters 18 of known form are located and a further parallel walled section 16d. The splitters commonly comprise a porous metal shell filled with sound absorbent material. The disadvantages of such an arrangement are that the sound absorbent material tends to be pulled through apertures in the metal shell and the assembly of splitters can be too heavy, thereby raising the centre of gravity of the vessel in which they are mounted too close to the vessel metacentre with consequent effects on the vessel stability.

Referring to FIGS. 2 to 5 inclusive, the noise attenuating duct 19 according to the invention is supported and located in the well 17 which is defined by the structure of the vessel 8, replaces the sections 16c and 16d of exhaust duct 16 and comprises a porous inner cylindrical stainless steel member 20 and a plurality of circumferentially arranged stainless steel channel members 22 which are welded to the porous member 20, and define in conjunction with the porous member, a plurality of annular circumferential noise attenuating cells 24.

The porous inner member 20 has apertures 20a which are formed in those parts of the cylinder which are in communication with the interior of the cells 24, the parts of the member 20 between the channel members 22 being left solid. The duct is supported and located in the well 17, at least in part by arms 23 which rest on supports 25.

Thermal insulation material 26 e.g. a mineral wool blanket, is wrapped around the exterior of the channel members 22 and because both the channel members 22 and the spaces between the channel members are closed there is no possibility of the material 26 being drawn into the attenuation duct 19 of exhaust duct 16 (FIG. 2). The insulation material 26, which can comprise one or more layers, two layers being shown in FIG. 5 are contained with a glass cloth skin 28.

The skin 28 and insulation material 26 are held in position by a number of radial studs 30 (FIG. 5) welded to the inner member between adjacent channel members 22, a low conductivity coupling 32 screwed to each stud and a fastener 34 screwed to each coupling.

The channel members 22 consist of three integral webs 22a, 22b and 22c and the junctions 22d between the flanges which are welded to the cylinder 20 and the webs 22b and 22c are shaped to accommodate differential thermal expansion between the cylinder 20 and the members 22. Such expansion can occur when the gas turbine engine power plant is started up rapidly or if there is a sudden acceleration with a subsequent rapid increase in temperature of the exhaust gas. The cylinder 20 will heat up very quickly because it is in intimate contact with hot exhaust gas whilst the channel members heat up and expand more slowly. The shape of the junctions 22d allows such differential expansion to take place without overstraining the cylinder 20 or the channel members 22.

The channel members 22 can be made singly, by pressing and rolling from plate and each welded separately to the cylinder 20 or they can be formed in units of two or more channels and then welded to the cylinder.

If desired the annular noise attenuating cells 24 can be sub-divided into segments by the use of baffle plates which extend radially between the cylinder 20 and the web 22a of each channel member.

The sections 20 of duct 19 are secured together and to other ducting by conventional bolted flange arrangements 36. Preferably one end of the duct should be fixed as shown in FIG. 4, whilst the other end and intermediate points are supported to locate the duct radially but allow for expansion axially, i.e. in the direction of hot exhaust gas flow.

The degree of porosity, e.g. the number and the size of the apertures 20a can be varied along the length of the duct so that different parts of the duct can be tuned to attenuate different noise frequencies.

In the embodiment shown, the degree of porosity is such that 3% of the wall area of the cylinder 20 is open and typically the proportion of each cell 24 are in the ratios, depth to width at apex 1:1.19 and depth to width at base 1:1.984. The cell size and porosity can be varied to suit the noise frequencies being attenuated.

The invention has been particularly described with reference to the attenuation of noise in a hot gas duct but it can be equally well applied to cold gas flows and can be applied to the ambient air inlet 14. Other materials than stainless steel can be used for the cylinder 20 and the members 22, for example aluminum if the duct is to be used as an inlet duct for the intake of marine gas turbine engine power plant or mild steel if the duct is to be located in a non-corrosive atmosphere.

The apertures 20a can be provided over the whole of the surface of the cylinder 20 and can be closed off between adjacent cells 24 by the flanges of the channel members 22 which are welded to the cylinder, to render that section of the inner member non-porous.

We claim:

1. A marine vessel having a gas turbine engine power plant, said gas turbine engine power plant having an associated gas flow duct supported by structure of the marine vessel and located within a well in the vessel structure, said gas flow duct having a plurality of perforate portions interspaced with plain portions, a plurality of circumferentially arranged axially spaced non-porous channel members attached to said gas flow duct and axially spaced from each other along the gas flow duct adjacent each of said respective perforate portions, said channel members and said perforate portions of the gas flow duct together defining a plurality of trapezoidal section annular noise attenuating cells with said plain portions being positioned between adjacent cells, and at least one layer of heat insulating material surrounding the exterior of said non-porous channel members, and covering means surrounding said insulating material and containing the same, said covering means being secured to said gas flow duct.

2. A marine vessel as claimed in claim 1 in which said perforate portions of said gas flow duct are defined by a plurality of equi-spaced apertures extending through said gas flow duct.

3. A marine vessel as claimed in claim 2 in which said apertures of said perforate portions are 3% of the total surface area of the same.

4. A marine vessel as claimed in claim 2 in which each of said annular cells has a proportional depth to width ratio at the apex of 1:1.19 and at the base of 1:1.984.

5. A marine vessel as claimed in claim 1 in which said gas flow duct comprises at least a part of an exhaust duct of the gas turbine engine power plant.

6. A marine vessel as claimed in claim 1 in which said gas flow duct comprises at least a part of an intake of the gas turbine engine power plant.

7. A sound attenuating duct associated with a marine gas turbine engine power plant, said duct having a plurality of perforate portions interspaced with plain portions, a plurality of circumferentially arranged axially spaced non-porous channel members attached to said duct and axially spaced along the duct adjacent each of said respective perforate portions, said channel members and said perforate portions of said duct between them defining a plurality of trapezoidal section annular noise attenuating cells, said plain portions of said duct being positioned between adjacent cells, and at least one layer of heat insulating material surrounding the non-porous channel members, and covering means for containing said heating insulating material, said covering means being secured to said gas flow duct means.

8. A sound attenuating duct as claimed in claim 7 in which each annular cell has proportional ratios of depth to width at apex of 1:1.19 and at base of 1:1.984.

9. A sound attenuating duct as claimed in claim 7 in which said perforate portions are defined by apertures extending through said duct, said apertures having a surface area of substantially 3% of the total surface area of said perforate portions.

10. A sound attenuating duct as claimed in claim 7 in which said perforate portions of said duct are provided by a plurality of equi-spaced apertures extending through the duct.

* * * * *